Oct. 5, 1965 W. G. McKENZIE 3,209,956
METERING DISPENSER OPERATED BY THE PRESSURE
OF MATERIAL DISPENSED
Filed Aug. 24, 1964
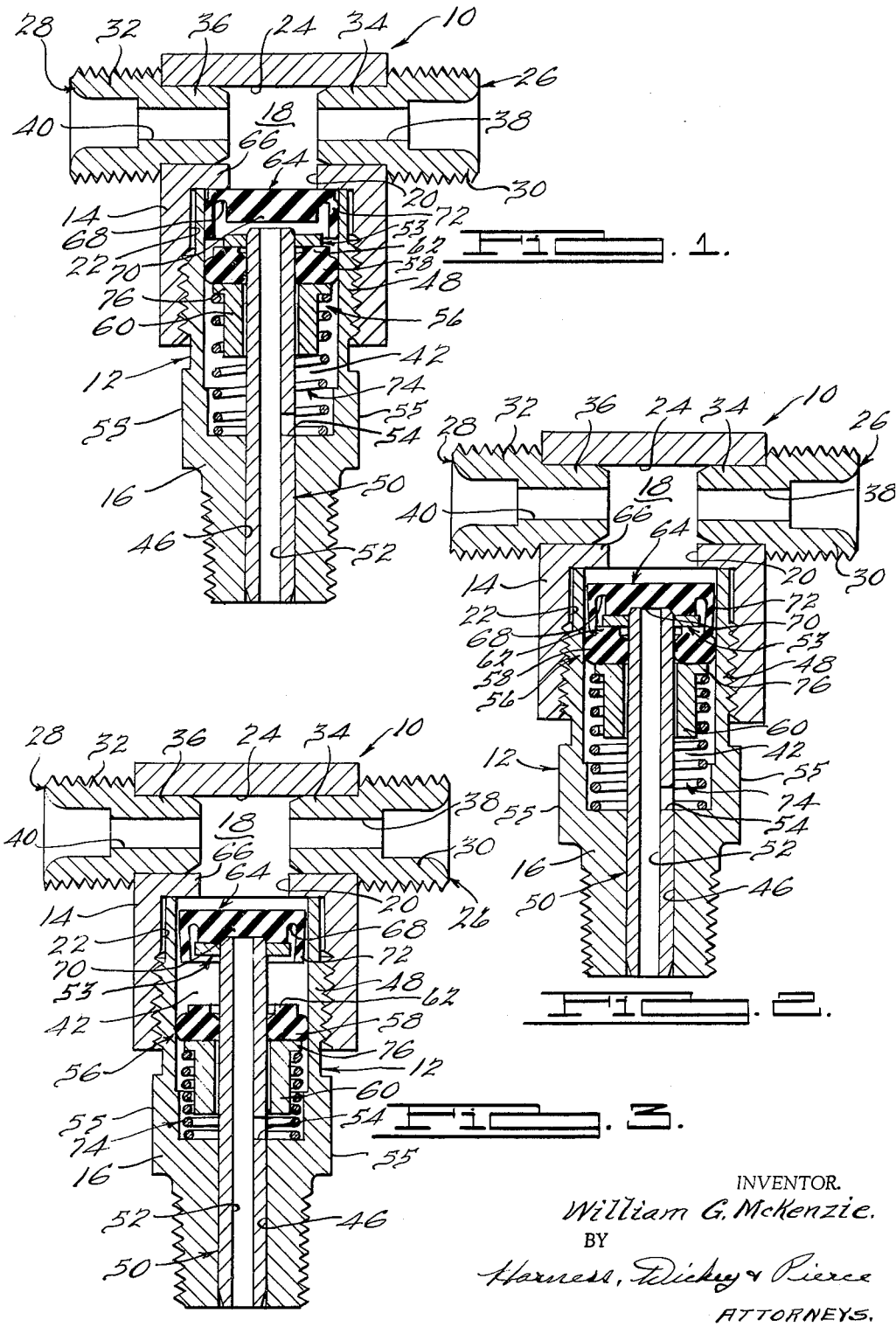
INVENTOR.
William G. McKenzie.
BY
Harness, Dickey & Pierce
ATTORNEYS.

United States Patent Office 3,209,956
Patented Oct. 5, 1965

3,209,956
METERING DISPENSER OPERATED BY THE PRESSURE OF MATERIAL DISPENSED
William G. McKenzie, Racine, Wis., assignor to Walker Manufacturing Company, Racine, Wis., a corporation of Delaware
Filed Aug. 24, 1964, Ser. No. 391,638
3 Claims. (Cl. 222—318)

This invention relates generally to a fluid metering device, and more particularly, to a positive displacement fluid meter which operates to deliver preselected measured shots or charges of fluid when connected to a source of fluid under pulsed pressure.

It is an object of the present invention to provide a positive displacement fluid meter which operates to discharge a predetermined measured "shot" of fluid with each pressure pulse of the fluid source.

It is another object of the present invention to provide a fluid meter of the above character of an extremely compact design.

It is still another object of the present invention to provide a fluid meter of the above character which is simple in construction and thus economical to commercially manufacture.

Other objects and advantages of the present invention will become apparent from the following detailed description taken in conjunction with the accompanying drawings wherein:

FIGURE 1 is a longitudinal cross-sectional view of the fluid meter of the present invention in a static condition;

FIGURE 2 is a view similar to FIGURE 1, and illustrates the fluid meter of the present invention immediately after pressure is applied to its associated pulsed pressure fluid system; and FIGURE 3 is a view similar to FIGURES 1 and 2, and illustrates the fluid meter of the present invention at the end of its injection stroke.

Referring now to the drawing, a fluid meter 10, in accordance with a preferred embodiment of the present invention, comprises a meter housing assembly 12 which consists of an annular cover member 14 and a hollow cylindrical body member 16. The cover member 14 is formed with an axially upwardly extending central bore 18 which is comprised of upper and lower bore sections 20 and 22, the latter of which is internally threaded and is slightly larger in diameter than the bore section 20. The cover member 14 is also formed with a bore 24 which extends diametrically through the member 14 and communicates with the upper section 20 of the central bore 18. A pair of identical line fittings 26 and 28 having externally threaded outer sections 30 and 32 and reduced diameter inner sections 34 and 36, are secured to the cover member 14 by having their inner sections 34 and 36 press fitted within the opposite ends of the bore 24. The fittings 26 and 28 are formed with central bores 38 and 40, respectively, and are adapted to communicate fluid under pulsed pressure into the interior of the houing 12 when suitable fittings (not shown) on the associated fluid line communicating the meter 10 with a fluid source, are threadably connected to the sections 30 and 32 of the line fittings 26 and 28.

The body member 16 of the meter housing assembly 12 is formed with an annular metering chamber 42 which is communicable with the lower end of the body member 16 through a downwardly extending bore 46. A threaded medial section 48 is formed around the exterior on the body member 16 radially outwardly from the chamber 42, onto which the cover member 14 is designed to be screwed or threaded, whereby the metering chamber 42 in the body member 16 is communicable with the bores 18, 38 and 40 in the cover member 14. A fluid outlet tube 50 having a central bore 52 and provided with a flat disc-shaped stop 53 on the upper end thereof is coaxially supported within the chamber 42 by having its lower end press fitted within the bore 46. A port 54 is formed in a medial section of the tube 50 and communicates the bore 52 with the lower end of the metering chamber 42. The lower end of the body member 16 is externally threaded and is thereby adapted to threadably receive a suitable outlet fitting (not shown) to communicate a fluid outlet line (not shown) with the bore 52 of the outlet tube 50. A plurality of wrench-engaging surfaces or facets 55 are formed around the body member 16 between the threaded lower end thereof and the threaded medial section 48 to facilitate screwing the associated outlet fitting to the lower end of the meter 10.

A fluid pressure-responsive piston assembly, generally designated 56 and comprising a resilient annular sealing member 58 and a hollow cylindrical spacer 60, is slidably disposed within the metering chamber 42 coaxially of the outlet tube 50. Preferably, the thickness of the sealing member 58 is slightly larger than the radial distance between the inner periphery of the chamber 42 and the outer periphery of the tube 50 so that upon assembly of the piston assembly 56 within the chamber 42, the sealing member 58 will be slightly compressed to provide a fluid-tight, but slidable, seal between the piston assembly 56 and the adjacent sides of chamber 42 and outlet tube 50. The sealing member 58 is formed with an upwardly extending shoulder portion 62 which is adapted to abut against the lower side of the stop 53, as illustrated in FIGURES 1 and 2. It may be noted that the inside diameter of the spacer 60 is slightly larger than the outside diameter of the tube 50 and thus the spacer 60 is freely slidable with the sealing member 58 along the tube 50.

A cup-shaped sealing retainer 64, which is fabricated of a resilient fluid-impervious material such as synthetic rubber or the like, is slidably disposed within the chamber 42 between the upper end of the outlet tube 50 and a radially inwardly extending portion 66 of the housing 12 that is formed at the juncture of the bore sections 20 and 22 of the cover member 14. The lower side of the retainer 64 is formed with an annular recess 68 which define a central downwardly projecting boss portion 70. When the retainer is in its lowermost position, as illustrated in FIGURES 2 and 3, the portion 70 is adapted to engage the upper end of the outlet tube 50 which projects slightly above the upper surface of the stop 53, whereby an effective fluidtight seal is provided between the interior of the chamber 42 and the outlet tube's bore 52. The outer peripheral portion of the retainer 64, herein designated by the numeral 72, resiliently and slidably engages the periphery of the chamber 42 and functions to selectively permit fluid flow from the bore 18 to the interior of the chamber 42, as will be described.

A helical coil spring extends coaxially of the outlet tube 50 and the spacer 60 between the lower end of the metering chamber 42 and a radially outwardly extending shoulder section 76 that is formed on the upper end of the spacer 60. The spring 74 and sealing retainer 64 are constructed such that when normal (static) fluid line pressure exists within the bore 18, the spring 74 resiliently maintains the piston assembly 56 in the position illustrated in FIGURE 1, whereby the sealing retainer 64 is compressed between the top of the piston assembly 56 and the portion 66 of the cover member 14. Also during static fluid pressure conditions, the peripheral portion 72 of the retainer 64 exerts a radially outwardly directed force against the periphery of the chamber 42, thereby providing a fluid-tight seal between the outer periphery of the retainer 64 and the periphery of the chamber 42. When the pressure within the bore 18 increases, for example, when a pressure pulse occurs in the fluid system, the retainer 64 is biased downwardly into engagement with the top of the outlet tube 50, whereby the bore 52 in the tube 50 is effectively sealed as the boss portion 70 of the retainer 64 engages the upper end of the tube 50, as above described. The increase in pressure also acts to compress the peripheral portion 72 of the retainer 64 radially inwardly away from the periphery of the chamber 42, thus providing an annular flow orifice between the outer periphery of the retainer 64 and the periphery of the chamber 42, as seen in FIGURES 2 and 3.

The operation of the fluid meter 10 will now be described with the line fittings 26 and 28 connecting the meter 10 in series to a fluid source under pulsed pressure, and with a suitable outlet nozzle or conduit communicating metered fluid from the lower end of the body member 16 to the fluid's operative destination.

In operation, as the fluid line pressure increases, the sealing retainer 64 is forced downwardly within the metering chamber 42 into engagement with the upper end of the outlet tube 50, whereby the boss portion 70 on the lower end of the retainer 64 engages the upper end of the tube 50 to provide a fluid-tight seal between the interior of the chamber 42 and the bore 52 in the tube 50. As the line pressure further increases, the peripheral portion 72 of the retainer 64 is forced radially inwardly, thereby providing the aforementioned annular flow orifice between the outer periphery of the retainer 64 and the periphery of the metering chamber 42. As the portion 72 moves out of engagement with the periphery of the chamber 42, pressurized fluid flows downwardly around the retainer 64 and forces the piston assembly 56 downwardly against the resistance of the coil spring 74, as seen in FIGURE 3. As the piston assembly 56 moves downward within the metering chamber 42, fluid within the chamber 42 below the piston assembly 56 is forced through the port 54 in the outlet tube 50 and downward through the bore 52 of the tube 50, from where it is communicated through a suitable nozzle or conduit (not shown) to its operative destination.

When the fluid line pressure is relieved, for example, at the end of a pressure pulse, the coil spring 74 biases the piston assembly 56 upwardly within the chamber 42, whereby the fluid between the top of the piston assembly 56 and the bottom of the sealing retainer 64 forces the retainer upwardly into engagement with the portion 66 of the cover member 14 and causes the peripheral portion 72 of the retainer 64 to expand into engagement with the periphery of the chamber 42 to prevent fluid from bypassing the retainer 64. As the retainer 64 moves upwardly within the chamber 42, the boss portion 70 on the lower side of the retainer 64 moves out of sealing engagement with the top of the tube 50, whereby the fluid between the retainer 64 and the piston assembly 56 will be forced into the bore 52 of the tube 50. It may be noted that as the piston assembly 56 is biased upwardly within the chamber 42, by the coil spring 74, it creates a vacuum which causes the fluid that has been displaced by the upward movement of the piston assembly 56 and which has been forced into the return tube 52, to be drawn into the lower end of the chamber 42 through the port 54. The fluid thus drawn into the chamber 42 comprises the next successive "shot" or charge of fluid which will be dispensed out of the meter 10 upon the next pressure pulse in the fluid source.

It will be apparent from the foregoing, that the volume of fluid in each "shot" or charge that is dispensed from the meter 10 is equal to the volume of fluid disposed within the chamber 42 below the piston assembly 56. It will also be evident that this volume may be readily changed by merely varying the relative size of the chamber 42, i.e., by either increasing or decreasing the diameter or the length of the body member 16.

The metering device of the present invention is particularly directed toward use in a lubrication system where it is adapted to meter successive charges of lubricating oil to various bearing surfaces such as those found in vehicles, engines, and in industrial machinery. It will be apparent, however, that the present invention is not limited to such use, for example, the meter 10 may be used to dispense successive "shots" or charges of liquid coolants, protective coatings and the like.

While it will be apparent that the preferred embodiment herein illustrated is well calculated to fulfill the objects above stated, it will be appreciated that the fluid meter of the present invention is susceptible to modification, variation and change without departing from the proper scope or fair meaning of the subjoined claims.

What is claimed is:
1. In a fluid metering device,
a meter housing comprising a cylindrical body and a closure member covering one end of said body,
said body defining an axially extending metering chamber and a downwardly extending bore communicable with the lower end of said chamber,
said closure member being threadably secured to said body and having an axially extending bore communicable with said chamber,
said closure member having a transversely extending passageway communicating fluid to said last mentioned bore,
fitting means communicating said passage with a fluid source,
a cylindrical fluid outlet tube mounted coaxially of said chamber and having its lower end rigidly secured within said first mentioned bore,
stop means on said tube,
said tube having an axially extending outlet passage and a transversely extending port communicating said passage with said metering chamber,
a resilient deformable sealing retainer slidably disposed within said chamber between the top of said outlet tube and a portion of said closure member defining said central bore in said closure member,
said retainer being slidable within said chamber to and from a position sealing said bore in said closure member,
said retainer having a downwardly extending peripheral flange section yieldably engageable with the periphery of said metering chamber,
a piston assembly slidable along said tube and comprising a resilient deformable sealing member and a hollow cylindrical spacer,
said sealing member being in sealing engagement with said tube and said periphery of said metering chamber and including an upwardly extending shoulder portion that is engageable with said stop means on said tube, and
spring means resiliently urging said piston assembly upward within said chamber toward said retainer.

2. A metering device as set forth in claim 1 wherein the lower side of said sealing retainer is engageable with the upper end of said outlet tube to block fluid communication between said metering chamber and said passage in said outlet tube.

3. A metering device which includes,
a meter housing comprising a body section and closure means threadably secured to said section and covering one end thereof,
said body section defining an annular metering chamber therewithin,
transversely and axially extending fluid passage means within said closure means communicating said metering chamber with a fluid source,
a fluid outlet tube disposed coaxially within said housing and adapted to communicate fluid from said metering chamber to the lower end of said housing,
said tube having an axially extending outlet passage and a transversely extending port communicating said passage with said chamber,
a radially outwardly extending stop formed on the upper end of said tube, an annular cup-shaped sealing member of substantially the same diameter as said metering chamber and being axially slidable therewithin,
said sealing member being formed with an axially downwardly extending flange portion which is spaced radially outwardly from said member and which is movable and from sealing engagement with the periphery of said metering chamber,
said sealing member being further formed with a downwardly projecting portion on the lower end thereof,
said portion being adapted to resiliently engage the upper end of said outlet tube whereby communication between said outlet tube and the interior of said metering chamber is blocked,
said flange portion being normally engaged with the periphery of said chamber and thus blocking communication between said fluid source and the interior of said chamber, but being movable away from said periphery of said chamber in response to preselected fluid pressure in said chamber to permit fluid to pass between said member and said periphery of said chamber,
a piston assembly axially slidable within said metering chamber,
said piston assembly comprising a spacer member freely slidable along said outlet tube and an annular sealing means compressed between the exterior of said tube and said periphery of said metering chamber, said sealing means being formed with an upwardly extending portion which is engageable with said stop on said outlet tube, and
spring means within said metering chamber and extending around the outer periphery of said downwardly extending portion of said sealing means, said spring means resiliently urging said piston assembly toward said stop.

References Cited by the Examiner

UNITED STATES PATENTS 2,905,270   9/59   Jackson.
3,119,463   1/64   Jackson _____ 222—335 X M. HENSON WOOD, JR., *Primary Examiner.*

LOUIS J. DEMBO, *Examiner.*